United States Patent [19]
Francis et al.

[11] 3,726,792
[45] Apr. 10, 1973

[54] MOLECULAR SIEVE SELECTIVE ADSORPTION PROCESS

[75] Inventors: James O. Francis, Houston, Tex.; Ralph M. Lewis, New York, N.Y.; Lawrence R. Trammell, Port Arthur; George W. Vachuda, Houston, both of Tex.

[73] Assignee: Texaco Inc., New York, N.Y.

[22] Filed: Sept. 20, 1971

[21] Appl. No.: 181,792

[52] U.S. Cl. .............................208/310, 260/676 MS
[51] Int. Cl. ..............................................C10g 25/04
[58] Field of Search .................208/310; 260/676 MS

[56] References Cited
UNITED STATES PATENTS

| | | | |
|---|---|---|---|
| 3,520,801 | 7/1970 | Lewis et al. | 208/310 |
| 3,619,418 | 11/1971 | Lewis | 208/310 |

Primary Examiner—Herbert Levine
Attorney—Thomas H. Whaley et al.

[57] ABSTRACT

A method for separating $C_8 - C_{24}$ carbon number range straight chain hydrocarbons from hydrocarbon mixture employing a molecular sieve selective adsorption process comprising an adsorption cycle and a desorption cycle operated in the vapor phase at an elevated temperature and super-atmospheric pressure wherein a vaporized desorbent hydrocarbon is employed in the desorption cycle. Also a method for treating a selective adsorbent effluent to recover desorbent hydrocarbon for recycle to the selective adsorption process.

8 Claims, 2 Drawing Figures

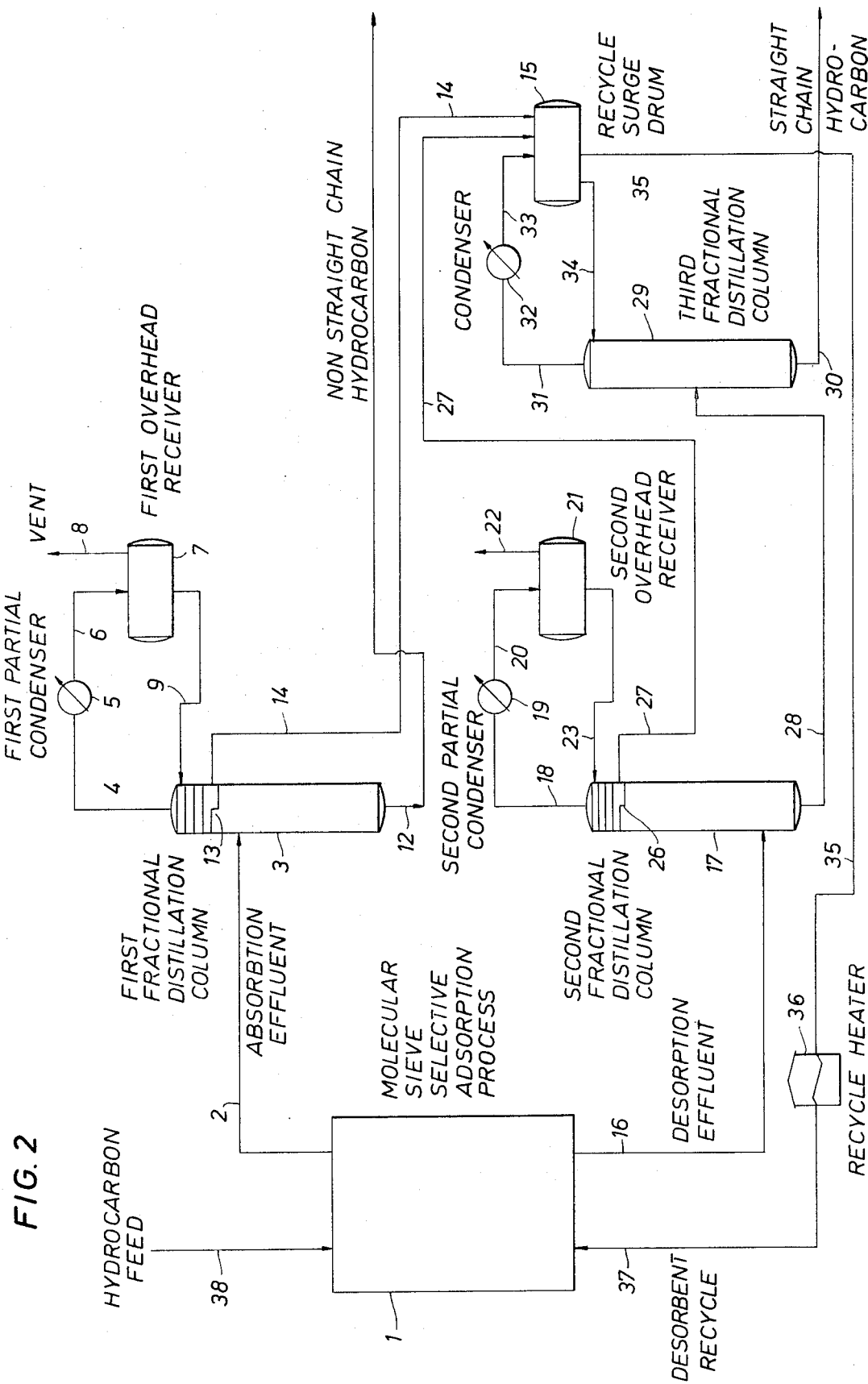

MOLECULAR SIEVE SELECTIVE ADSORPTION PROCESS

BACKGROUND OF THE INVENTION

1. Field of the Invention

Molecular sieve selective adsorption processes for the separation of $C_8 - C_{24}$ straight chain hydrocarbons from hydrocarbon mixtures are known. Such molecular sieve selective adsorption processes comprise an adsorption cycle and a desorption cycle and employ a molecular sieve selective adsorbent contained within an adsorbent case or vessel. The molecular sieve selective adsorption processes contemplated herein may be designed for vapor phase operation at a super-atmospheric pressure and under essentially isothermal conditions. The particular operating conditions selected are dependent on the nature of the feed stream to the adsorption case, the carbon number of the feed stream and desired product stream as well as the carbon number distribution (relative amounts of each carbon number) within the carbon number range, and the straight chain hydrocarbon content of the feed stream.

A molecular sieve selective adsorption process for separating $C_8 - C_{24}$ straight chain hydrocarbons from mixtures thereof with non-straight chain hydrocarbons may comprise the following cycles: An adsorption cycle; a depressuring cycle; a purge cycle; a repressuring cycle; and a desorption cycle. At the end of the desorption cycle, another adsorption cycle is begun.

In the adsorption cycle, a hydrocarbon mixture containing $C_8 - C_{24}$ range straight chain hydrocarbons in the vapor phase and at an elevated temperature and super-atmospheric pressure may be contacted with a molecular sieve selective adsorbent to adsorb the straight chain hydrocarbons into the selective adsorbent. Unadsorbed portions of the hydrocarbon mixture pass from the selective adsorbent as an adsorption cycle effluent. The adsorption cycle may be operated at pressures of from about 25 psig to about 75 psig. At these pressures, a hydrocarbon mixture containing $C_8 - C_{24}$ straight chain hydrocarbons such as a kerosene or gas oil range hydrocarbon must be heated to a temperature in the range of from about 500°F. to about 700°F. to maintain the hydrocarbon mixture in the vapor phase. When such hydrocarbon mixtures are vaporized at these temperatures some thermal cracking occurs, additionally more cracking may occur when the hydrocarbon mixture contacts the selective adsorbent as the aluminosilicate molecular sieves employed as adsorbents may have slight catalytic activities. A characteristic of such molecular sieve selective adsorption processes operated in the vapor phase is that cracking of hydrocarbon components increases with increasing temperature. The product of such cracking includes low molecular weight compounds and coke. A portion of the cracked low molecular weight compound pass from the selective adsorbent in the adsorption cycle effluent while the remainder is adsorbed in the selective adsorbent and subsequently removed with the desorption effluent during the desorption cycle. The coke accumulates upon the selective adsorbent, thereby decreasing its capacity to adsorb straight chain hydrocarbons.

Upon termination of the adsorption cycle, a depressuring cycle may be commenced wherein the pressure on the selective adsorbent during the adsorption cycle is relieved thereby allowing unadsorbed portions of the hydrocarbon feed mixture to escape from the adsorption case. The effluent from the depressuring cycle may be returned as supplemental charge to a subsequent adsorption cycle.

When the pressure on the selective adsorbent is reduced to the desired value, a purge cycle may be begun. In the purge cycle, a superheated desorbent hydrocarbon vapor is contacted with the selective adsorbent to remove any remaining unadsorbed hydrocarbon feed mixture from the adsorbent case. Effluent from the purge cycle may be returned to a subsequent absorption cycle as a supplemental charge material. By returning effluent of the depressuring cycle and purge cycle to a subsequent adsorption cycle as supplemental charge, losses of the desired straight chain product and of valuable desorbent hydrocarbon may be substantially minimized.

Upon completion of the purge cycle, flow of effluent from the selective adsorbent is stopped and the adsorbent case may be repressured by flowing superheated desorbent hydrocarbon vapor into the adsorbent case. The pressure on the selective adsorbent, in the repressuring step, may be increased to a pressure in the range of from about 5 to 15 psig higher than the pressure employed in the adsorption cycle for improved desorption of the $C_8 - C_{14}$ straight chain hydrocarbons from the selective adsorbent in the following desorption cycle.

When the desired pressure on the selective adsorbent has been obtained, flow of superheated desorbent hydrocarbon vapor may be instituted through the selective adsorbent. This flow of desorbent hydrocarbon vapor desorbs the adsorbed straight chain hydrocarbons from the selective adsorbent. Desorbent hydrocarbon vapors and vaproized desorbed straight chain hydrocarbons are removed from the selective adsorbent as a desorption effluent stream. Upon completion of this desorption cycle, flow of desorbent hydrocarbon to the selective adsorbent is stopped and another adsorption cycle is begun.

In such molecular sieve selective adsorption processes it is known that the straight chain hydrocarbons are most easily desorbed by employing a desorbent hydrocarbon of about the same molecular weight. It is also known that straight chain hydrocarbons are more effective as desorbent hydrocarbons than non-straight chain hydrocarbons. However, should a desorbent hydrocarbon of the same molecular weight as the adsorbed hydrocarbons be employed, it would not be possible to separate the desorbent hydrocarbon from the desired product. In order to effect a separation of the desorbent hydrocarbon from the product hydrocarbon it is known to employ a straight chain desorbent hydrocarbon of from one to three carbon atoms less than the lightest component of the product hydrocarbon. For example, where the product hydrocarbon comprises $C_8 - C_{14}$ range hydrocarbons, a $C_7$ straight chain hydrocarbon is a preferred desorbent and where the product hydrocarbon comprises $C_{13} - C_{24}$ hydrocarbons, $C_{10}$ straight chain hydrocarbon is a preferred desorbent. Such straight chain hydrocarbons useful as desorbent hydrocarbon are relatively expensive and it is desirable to recover these desorbent hydrocarbons from the adsorption cycle effluent and from the desorption cycle effulent for recycle to the molecular sieve selective adsorption process.

Fractional distillation of the effluent streams from the molecular sieve selective adsorbent are complicated by the fact that the molecular sieve selective adsorption process is a cyclic process. The flow rate and composition of the adsorption cycle effluent and the desorption cycle effluent fluctuate continuously during the operation of the molecular sieve selective adsorption process.

It is desirable to recover the desorbent hydrocarbon in a relatively high degree of purity for recycle to the molecular sieve selective adsorption process to maintain its desorbing efficiency. Also, it is desirable to recover the desorbent hydrocarbon at a relatively high temperature thereby reducing the heat energy requirements of the molecular sieve selective adsorption process. The presence of cracked hydrocarbons in the selective adsorbent effluent complicate the attainment of the above desirable aims. The cracked hydrocarbons, in a fractional distillation step, tend to be recovered along with the desorbent hydrocarbon thereby contaminating the desorbent hydrocarbon and decreasing its efficiency in the desorption step. Also, the low boiling cracked hydrocarbons tend to reduce the bubble point temperature when they are mixed with the desorbent hydrocarbon, thereby reducing the temperature at which the desorbent hydrocarbon may be recovered. The presence of the cracked hydrocarbons also increase the volume of desorbent recycle which must be circulated to the selective adsorption process. This bubble point reduction and increases desorbent recycle volume imposes an additional heat energy requirement upon the molecular sieve selective adsorption process for vaporizing and superheating the desorbent recycle.

The known methods for recovering a desorbent hydrocarbon recycle fraction from a selective adsorbent effluent comprises fractionally distilling the selective adsorbent effluent into a heavy hydrocarbon fraction and a light hydrocarbon vapor fraction. The light hydrocarbon vapor fraction comprising desorbent hydrocarbon and lower boiling materials is partially condensed. The condensate is recovered as desorbent hydrocarbon recycle and the noncondensed vapors are vented to remove low boiling materials from the system. Under these conditions the desorbent hydrocarbon recycle is saturated with low boiling cracked hydrocarbons. These low boiling cracked hydrocarbons re-enter the molecular sieve selective adsorption process in the desorbent hydrocarbon recycle stream.

2. Prior Art

It is known, for example, from Hess et al. U.S. Pat. No. 2,859,256 that molecular sieve selective adsorbents such as those disclosed in U.S. Patent No. 2,882,243 can be used in separating straight chain hydrocarbons by adsorbing the straight chain components of the mixture in the pores of the selective adsorbent. It is also known, for example, from Ballard et al. U.S. Pat. No. 2,818,455 that the straight chain hydrocarbons adsorbed on the molecular sieve selective adsorbent can be desorbed therefrom using a gaseous hydrocarbon desorbing medium containing at least three carbon atoms per molecule.

SUMMARY OF THE INVENTION

According to the present invention, we have discovered an improved method for operating a molecular sieve selective adsorption process.

By following the improvements of the present invention the heat energy requirements for operating a molecular sieve selective adsorption process is substantially reduced, substantially all the desorbent hydrocarbon is recovered from the selective adsorbent effluent for recycle to the molecular sieve selective adsorption process, and unexpectedly, the rate of coke deposition on the selective adsorbent is reduced. Additionally, it has been unexpectedly discovered that the operating temperature of a molecular sieve selective adsorption process may be increased (thereby allowing higher boiling hydrocarbon feed mixtures to be separated) without an increase in the rate of coke desposition upon the selective adsorbent.

More particularly, the improvement of the present invention comprises separating an off-gas fraction from the selective adsorbent effluent containing from about 18 percent to about 25 percent desorbent hydrocarbon and recovering from the selective adsorbent effluent a recycle desorbent fraction substantially at its bubble point temperature.

Accordingly, in following the improvement of the present invention, we have found that, at the same operating temperature, the heat energy requirements for the operation of the molecular sieve selective adsorption process is decreased, the coke lay-down rate upon the selective adsorbent is decreased, and losses of desorbent hydrocarbon from the process are substantially decreased.

In another embodiment of the present invention, we have discovered that the temperature of the selective adsorption process may be increased without increasing coke lay-down rates and loss of desorbent hydrocarbon from the process is substantially decreased.

The above, and other advantages of the improvements of the present invention will be more fully explained in the detailed description of the invention which follows.

DETAILED DESCRIPTION OF THE INVENTION

Figure 1:
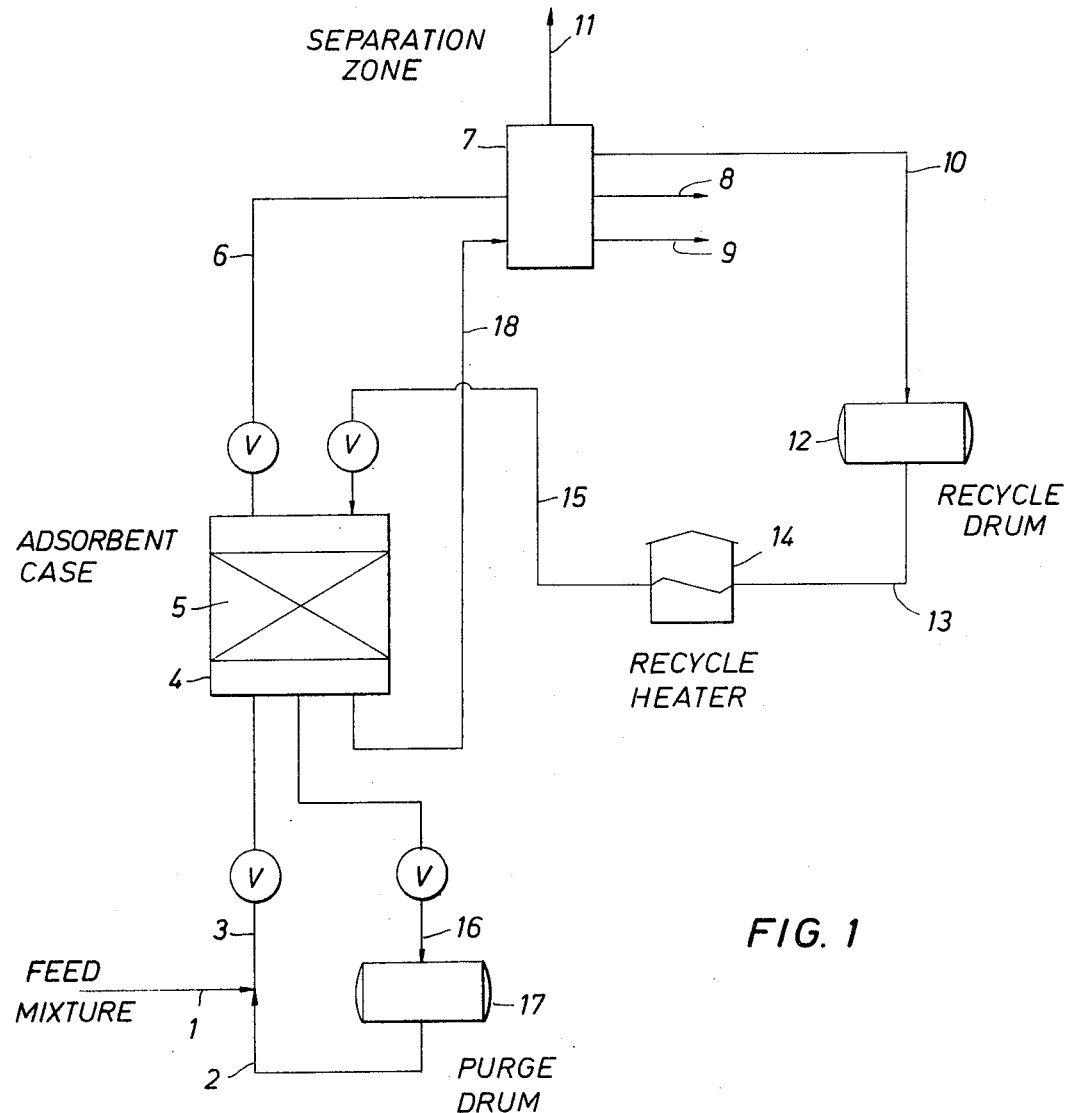

Relative heavy straight chain hydrocarbons, such as those in the $C_8 - C_{24}$ carbon number range are commercially useful products. Such straight chain hydrocarbons may be employed in the manufacture of such chemicals as alcohols, organic acids, and alkylated aromatic compounds. These straight chain hydrocarbons are found in admixture with non-straight chain hydrocarbons in certain petroleum fractions such as kerosene and gas-oil fractions as well as mixtures thereof. For example, a typical petroleum fraction which may be treated for the removal of straight chain hydrocarbon in the $C_8 - C_{14}$ carbon number range may have in the case of a kerosene fraction a boiling range of about 330°F. to about 545°F. and may contain a substantial amount of the straight chain hydrocarbon, e.g., 15 to 25 percent by wt. or more. The choice of the particular petroleum fraction from which the straight chain hydrocarbons are to be recovered is dependent on the carbon number range of the desired straight chain hydrocarbons as well as the percent of straight chain hydrocarbons contained in the petroleum fraction.

By the term "straight chain hydrocarbons" is meant an aliphatic or acyclic or open chain hydrocarbons which does not possess side chain branching. Representative straight chain hydrocarbons are the normal paraffins, and the normal mono- or polyolefins, including the straight chain acetylinic hydrocarbons. The non-straight chain hydrocarbons comprise the aromatic, napthenic isoparaffinic, iso-olefinic hydrocarbons and the like.

Straight chain hydrocarbons in the $C_8 - C_{24}$ carbon number range may be separated from mixtures with non-straight chain hydrocarbons by adsorption upon selective adsorbents. The adsorbents which are useful for such separations adsorb the straight chain hydrocarbons and exclude the non-straight chain hydrocarbons. Examples of selective adsorbents which may be used to separate straight chain from non-straight chain hydrocarbons include metal aluminosilicate zeolitic materials such as Zeolite A, Zeolite D, Zeolite T, Zeolite X, Erionite, Zeolite L, Zeolite Y, Chabozite, Faujasite and Mordenite as well as other known adsorbents which selectively adsorb straight chain hydrocarbon to the exclusion of non-straight chain hydrocarbons. Such selective adsorbents which selectively adsorb one configuration of a hydrocarbon molecule in preference to another configuration are commonly referred to as molecular sieves. A molecular sieve particularly suitable for separating straight chain hydrocarbons from non-straight chain hydrocarbon comprises a crystalline calcium substituted sodium aluminosilicate zeolite having openings in the crystalline lattice of about five Angstrom units.

The molecular sieve selective adsorption processes within the comtemplation of the present invention comprises an adsorption cycle and a desorption cycle. Such processes are carried out in the vapor phase at an elevated temperature and a super-atmospheric pressure.

In the adsorption cycle, a hydrocarbon feed mixture containing straight chain hydrocarbons of from about $C_8$ to about $C_{24}$ carbon number range is contacted in the vapor phase with a selective adsorbent. The straight chain components of the hydrocarbon feed mixture are adsorbed into the selective adsorbent, and the non-straight chain components are recovered from the adsorption cycle as a selective adsorbent effluent stream. The adsorption cycle is operated at a pressure of from about 10 to about 75 psig. At such pressures it is necessary to employ temperatures of from about 550°F. to about 700°F. to maintain the hydrocarbon feed mixture in the vapor phase. Preferably the hydrocarbon feed mixture is maintained at a temperature of about 50°F. above its dew point temperature.

In the desorption cycle, the adsorbed straight chain hydrocarbons are desorbed from the selective adsorbent. The temperature during the desorption cycle is maintained at about the same temperature employed in the adsorption cycle. Desorption of the adsorbed straight chain hydrocarbons is effected by contacting the selective adsorbent with a super-heated desorbent vapor. Desorbent vapor and desorbed straight chain hydrocarbons are recovered from the desorption cycle as a selective adsorbent effluent. Preferably, the pressure employed in the desorption cycle is from about 5 to about 15 psi higher than the pressure employed in the adsorption cycle.

The desorbent vapor employed in the desorption cycle comprises a straight chain hydrocarbon of from about 1 to about 3 carbon numbers less than the lightest straight chain hydrocarbon adsorbed upon the selected adsorbent. For example, where the adsorbed straight chain hydrocarbons comprise $C_8 - C_{14}$ hydrocarbons, the preferred desorbent is a straight chain $C_7$ hydrocarbon. Where the adsorbed straight chain hydrocarbons comprise $C_{13} - C_{24}$ range hydrocarbons, the preferred desorbent comprises $C_{10}$ straight chain hydrocarbons.

It is a characteristic of a molecular sieve selective adsorption process operated in the vapor phase at a temperature in the range of from about 550°F. to about 700°F., that a portion of the hydrocarbons are cracked in the process. It is a further characteristic of such a process, that as the temperature is increased, the rate of hydrocarbon cracking also increases. One product of such hydrocarbon cracking is coke which deposits upon the selective adsorbent. The deposited coke accumulates upon the selective adsorbent, reducing its capacity to adsorb straight chain hydrocarbons. Eventually, the accumulated coke deposits reduce the adsorptive capacity of the selective adsorbent to such an extent that the molecular sieve selective adsorption process must be stopped and the coke deposits removed. Commonly such coke deposits are removed by burning them from the selective adsorbent with oxygen. It is economically advantageous to minimize the accumulation of coke deposits on the selective adsorbent and thereby maintain the adsorptive capacity of the selective adsorbent for a longer period of time.

The other product of the hydrocarbon cracking comprises low boiling cracked hydrocarbons. These low boiling cracked hydrocarbons pass from the molecular sieve selective adsorption process as components of the selective adsorbent effluent.

The straight chain desorbent hydrocarbons employed in the desorption cycle are relatively expensive. Therefore, it is highly desirable to recover such desorbent hydrocarbons from the selective adsorbent effluent for recycle to the molecular sieve adsorbent process. When conventional fractional distillation means are employed to recover the desorbent hydrocarbon from the selective adsorbent effluent, it has been found that substantial amounts of low boiling cracked hydrocarbons are recovered along with the desorbent hydrocarbon. The presence of these cracked hydrocarbons in the desorbent recycle decrease the desorption efficiency of the desorbent in the desorption cycle. Also, the presence of the cracked hydrocarbons in the desorbent recycle add to the heat energy requirements required to vaporize and superheat the desorbent recycle stream.

The cracked hydrocarbons may be separated from the desorbent recycle according to the methods disclosed in this invention. By separating the cracked hydrocarbons from the desorbent recycle, the desorbing efficiency of the desorbent is maintained. Also, the heat energy requirements to vaporize and superheat the desorbent recycle stream are substantially reduced.

Additionally, we have discovered that by following the method of the present invention, the rate of coke deposition upon the elective adsorbent may be substantially reduced.

Accordingly, the method of the present invention comprises separating from the selective adsorbent effluent an off-gas fraction containing from about 18 percent to about 25 percent desorbent hydrocarbon and recovering from the selective adsorbent effluent a liquid desorbent hydrocarbon recycle fraction at about its bubble point temperature. By following the method of this invention, the loss of valuable desorbent hydrocarbon may be reduced, the desorbing efficiency of the desorbent vapor may be maintained, the heat energy requirement for vaporizing and superheating the desorbent recycle is substantially reduced, and the rate of coke deposition upon the selective adsorbent is substantially reduced such that the adsorptive capacity of the selective adsorbent is maintained for a longer period of time. Therefore, by following the method of the present invention, the adsorptive capacity of the selective adsorbent is maintained for a longer period before it is necessary to shut down the molecular sieve selective adsorption process and remove the accumulated coke deposits.

Moreover, it has been discovered that by following the method of the present invention, the temperature of the molecular sieve selective adsorption process may be increased without increasing the rate of coke deposition upon the selective adsorbent. As has been stated previously increasing temperature increases the rate of hydrocarbon cracking in this process, consequently, the rate of coke deposition would likewise be expected to increase. By applying the method of the present invention, the increased rate of coke deposition is not observed. This discovery has a practical utility in that it is economically desirable to recover straight chain hydrocarbons in the $C_{13} - C_{24}$ carbon number range. To vaporize such carbon number range hydrocarbons in a molecular sieve selective adsorption process, it is necessary to increase the temperature over the temperature employed to vaporize lighter hydrocarbons such as those in the $C_8 - C_{14}$ range. Prior to the discovery of the present invention, efforts to separate $C_{13} - C_{24}$ range hydrocarbons in a molecular sieve selective adsorption process were economically unsuccessful due to the rapid rate of coke deposition upon the selective adsorbent. The rapid coke deposition resulted in an equally rapid decline in straight chain hydrocarbon adsorptive capacity of the selective adsorbent. This rapid coke deposition required such frequency shut-downs of the molecular sieve selective adsorption process to remove the coke that it was not economically attractive to produce the desired $C_{13} - C_{24}$ straight chain hydrocarbons. Upon application of the method of the present invention it was discovered that the molecular sieve selective adsorption process could be operated to recover $C_{13} - C_{24}$ range straight chain hydrocarbons at temperatures sufficiently high to maintain the hydrocarbon feed mixture in the vapor phase and that the rate of coke deposition was no higher than the rate of coke deposition previously experienced when the molecular sieve selective adsorption process was employed to recover $C_8 - C_{14}$ range hydrocarbons.

It is unexpected that the rate of coke deposition upon the selective adsorbent is affected by separating a low boiling off-gas fraction containing from about 18 percent to about 25 percent desorbent hydrocarbon and recovering a desorbent hydrocarbon recycle fraction substantially at the desorbent hydrocarbon recycle temperature from the selective adsorbent effluent. Particularly it is unexpected that the operating temperature of a molecular sieve selective adsorption process may be increased without increasing the rate of coke deposition upon the selective adsorbent.

To better describe the present invention, a molecular sieve selective adsorption process for the separation of $C_8 - C_{14}$ range straight chain hydrocarbons from hydrocarbon mixtures wherein the selective adsorbent effluent is treated in a separation zone wherein an off-gas containing from about 18 percent to about 25 percent desorbent hydrocarbon is removed and wherein desorbent hydrocarbon substantially at its bubble point temperature is recovered for recycle to the molecular sieve selective adsorption process is shown in FIG. 1 of the attached drawings.

FIG. 1 of the attached drawing is a schematic flow diagram of a molecular sieve selective adsorbent process for separating $C_8 - C_{14}$ straight chain hydrocarbons from $C_8 - C_{14}$ range hydrocarbon feed mixture wherein the method of this invention for recovering desorbent hydrocarbon from the selective adsorbent effluent streams is incorporated.

In the adsorption cycle a hydrocarbon feed mixture comprising $C_8 - C_{14}$ straight chain and non-straight chain hydrocarbons in the vapor phase, at an elevated temperature and super-atmospheric pressure is charged into line 3 via line 1. Supplemental charge from a purge drum 17 enters line 3 via line 2. The hydrocarbon feed - supplemental charge mixture in line 3 passes into the adsorbent case 4. In the adsorbent case, $C_8 - C_{14}$ straight chain hydrocarbons are adsorbed into a bed of molecular sieve selective adsorbent 5. In the adsorption cycle, the adsorption case is maintained at a positive pressure of from about 10 to about 70 psig to permit the selective adsorbent to adsorb an additional quantity of the straight chain hydrocarbon components of the hydrocarbon feed. However, it is necessary to maintain the temperature during the adsorption cycle above the dew point of the vaporized charge to minimize surface adsorption of non-straight chain hydrocarbons upon the selective adsorbent. Unduly high temperatures will contribute to excessive cracking of the hydrocarbon charge stock. Therefore, keeping in mind the lower and upper temperature limitation, it has been found that a temperature range of from about 575°F. to about 700°F. is suitable during the adsorption cycle. Preferably the temperature range is maintained from about 620°F. to about 660°F. Adsorption cycle effluent comprising $C_8 - C_{14}$ non-straight chain hydrocarbons, desorbent hydrocarbons and cracked hydrocarbons leave the absorbent case 4 via line 6. The adsorption cycle effluent in line 6 passes into a separation zone 7. In the separation zone 7 the adsorption cycle effluent is separated into a $C_8 - C_{14}$ non-straight chain hydrocarbon component, a desorbent hydrocarbon component and a low boiling cracked hydrocarbon component. The low boiling cracked hydrocarbon component containing from about 18 percent to about 25 percent desorbent hydrocarbon is removed as off-gas from the separation zone 7 via line 11. The $C_8-C_{14}$ non-straight chain hydrocarbon component substantially free of desorbent hydrocarbon is recovered from the separation zone 7 via line 9. The desorbent hydrocarbon fraction is recovered from the separation zone 7 substantially at its bubble point temperature as an intermediate liquid stream via line 10. From line 10 this desorbent fraction is transferred into a recycle surge drum 12.

Following termination of the adsorption cycle, the adsorbent case 4 is depressured in a depressuring step to a pressure of from about 5 to about 10 psig. In the depressuring step some of the surface adsorbed non-straight chain hydrocarbons and unadsorbed hydrocarbon charge present in the adsorption case 4 are vented via line 16 into a purge drum 17.

When the adsorbent case 4 is depressured to the desired extent, the purge cycle begins. The purge cycle is carried out at the pressure of the depressuring step. In the purge cycle, a super-heated desorbent vapor enters the adsorbent case via line 15. The purge step is carried out at substantially the same temperature as the adsorption cycle and the depressuring step. The desorbent vapor entering the adsorbent case 4 in a direction counter-current to the flow of hydrocarbon charge during the adsorption cycle removes the remaining portion of the hydrocarbon charge from the adsorbent case 4. To remove substantially all of the unadsorbed hydrocarbon charge materials and at the same time minimize removal of the adsorbed $C_8 - C_{14}$ straight chain hydrocarbons, the flow of desorbent hydrocarbon vapor is limited to a value of from about 0.2 to about 3.0 purge volumes. The term purge volume refers to the volume of desorbent hydrocarbon in the purge effluent stream and one purge volume is equivalent to one vapor volume displacement of the adsorbent case 4. Most efficient operations are conducted employing a purge volume range of from 0.8 to 2.0 purge volumes when it is desired to attain very high straight chain hydrocarbon product purity. From the adsorbent case 4, the purge effluent comprising desorbent hydrocarbon vapor and non-straight chain hydrocarbon vapors passes via line 16 into the purge drum 17. As stated heretofore, the contents of the purge drum 17 are employed as supplemental charge to a subsequent adsorption cycle.

Upon completion of the purge cycle, the flow of desorbent vapor is continued into the adsorbent case 4 via line 15 and flow of purge effluent via line 16 is stopped. By this means the adsorbent case 4 is repressured to a desired pressure in preparation for the desorption cycle. Preferably the adsorption case is repressured to about 5 to about 15 psig above the pressure employed in the adsorption cycle, that is, from about 15 to about 90 psig.

When the adsorption case 4 is repressured to the desired pressure, flow of desorbent hydrocarbon vapor is continued to the adsorption case 4 via line 15 and flow of desorption effluent is instituted from the adsorption case via line 18. In this desorption cycle, the desorbent hydrocarbon vapor comprising $C_7$ straight chain hydrocarbons flows through the adsorbent case 4 in a direction counter-current to the flow of hydrocarbon charge during the adsorption cycle. The temperature in the adsorbent case 4 during the desorption cycle is maintained at about the same temperature employed in the adsorption cycle. Desorption effluent comprising $C_8-C_{14}$ straight chain hydrocarbons, desorbent hydrocarbon, and low boiling cracked hydrocarbons passes from the adsorbent case 4 via line 18 into the separation zone 7.

In the separation zone 7 the desorption effluent is separated into a $C_8-C_{14}$ straight chain fraction, a low boiling cracked hydrocarbon fraction, and a desorbent hydrocarbon fraction. The low boiling cracked hydrocarbon fraction containing from about 18 percent to about 25 percent desorbent is vented from the separation zone 7 via line 11. The $C_8 - C_{14}$ straight chain hydrocarbon fraction substantially free of desorbent is recovered as a product from the separation zone 7 via line 8. The desorbent hydrocarbon fraction substantially at its bubble point temperature is recovered as an intermediate liquid product from the separation zone 7 via line 10. The desorbent hydrocarbon fraction is transferred via line 10 to the recycle surge drum 12.

From the recycle surge drum 12 desorbent hydrocarbon is transferred via line 13 to the desorbent recycle heater 14. In the desorbent recycle heater 14 the desorbent hydrocarbon is vaporized and super-heated to a temperature of from about 620°F. to about 660°F. From the desorbent recycle heater 14, the super-heated desorbent vapor is transferred via line 15 to the molecular sieve selective adsorption process as described above.

Upon completion of the desorption cycle as hereinabove described, a subsequent adsorption cycle is begun and the molecular sieve selective adsorption process is repeated.

While the above detailed description of the molecular sieve selective adsorption process has referred to a single adsorbent case operation for simplicity, it is within the purview of this invention to operate the process on a multi-case basis, wherein one or more separate adsorbent cases are used in each of the main process steps. Such a molecular sieve selective adsorption process as is described is essentially a timed cyclic process. It has been found that satisfactory results may be achieved if the adsorption cycle is accomplished in about one-half of the total cycle time, the remaining one-half of the time being taken up by the remaining process cycles, e.g., depressuring, purging, repressuring and desorbing.

FIG. 2 of the attached drawings shows in a schematic flow diagram a particular configuration of a separation zone embodying the present invention wherein the adsorption effluent and the desorption effluent from a molecular sieve selective adsorption process as has hereintofore been described in FIG. 1 are subjected to improved fractional distillation methods. An off-gas containing from about 18 percent to about 25 percent desorbent hydrocarbon is separated from selective adsorbent effluent streams and desorbent hydrocarbon substantially at its bubble point temperature is recovered for recycle to the molecular sieve selective adsorption process.

From a molecular sieve selective adsorption process 1, an adsorption effluent stream comprising non-straight chain hydrocarbons, desorbent, and cracked hydrocarbons, is transferred via line 2 to a first fractionation column 3 wherein adsorption effluent is fractionated into a non-straight chain hydrocarbon fraction, a desorbent fraction and a cracked hydrocarbon fraction. From the top of the first column 3, an overhead vapor stream comprising desorbent and cracked hydrocarbons is removed via line 4 to a first partial condenser 5. In the first partial condenser 5 substantially all the desorbent is condensed along with a portion of the cracked hydrocarbons. From the partial condenser 5, condensate and non-condensed vapors pass via line 6 into a first overhead receiver 7. From the overhead receiver 7 the non-condensed vapors containing from about 18 percent to about 25 percent desorbent are vented via line 8. Condensate comprising desorbent and cracked hydrocarbons is transferred from the first overhead receiver 7 via line 9 as reflux to the top of the first distillation column 3. A bottoms stream comprising non-straight chain hydrocarbons and substantially free of desorbent is recovered from the bottom of the first distillation column 3 via line 12.

At a point within the first distillation column 3, the internal reflux substantially comprises desorbent hydrocarbons. Such internal reflux is collected on a trap tray 13. The liquid collected on trap tray 13 is removed via line 14 to a recycle surge drum 15 substantially at its bubble point temperature.

Desorption cycle effluent comprising straight chain hydrocarbons, desorbent and cracked hydrocarbons is recovered from the molecular sieve selective adsorption process 1 via line 16. From line 16 the desorption effluent is fed into a second fractional distillation column 17. A major portion of the desorbent and substantially all the cracked hydrocarbons pass upward as vapor in the second column 17. A minor portion of the desorbent and substantially all the straight chain hydrocarbons pass downward as liquid in the second column 17.

An overhead vapor stream comprising desorbent and cracked hydrocarbons is removed from the top of the second distillation column 17 via line 18. From line 18 the overhead vapor is passed into a second partial condenser 19. In the second partial condenser 19 substantially all the desorbent and some of the low boiling cracked hydrocarbons are condensed. From the second partial condenser 19 the condensate and non-condensed vapors pass via line 20 into a second overhead receiver 21. From the second overhead receiver 21, non-condensed cracked hydrocarbon vapors containing from about 18 percent to about 25 percent desorbent are vented via line 22.

Condensate collected in the second overhead receiver 21, comprising desorbent and cracked hydrocarbons, passes into line 23. Via line 23 the condensate is returned as reflux to the top of the second column 17.

At a point within the column 17, the internal reflux comprises substantially desorbent hydrocarbon. Such internal reflux comprising substantially desorbent hydrocarbon is collected on trap tray 26. The liquid collected on trap tray 26 is removed at its bubble point temperature via line 27 to the recycle surge drum 15.

From the bottom of the second distillation column 17, a liquid comprising straight chain hydrocarbons and desorbent hydrocarbon is withdrawn via line 28. This second distillation column bottoms liquid is transferred via line 28 into a third distillation column 29. In the third distillation column 29 the straight chain hydrocarbons are separated from the desorbent hydrocarbon.

The straight chain hydrocarbons substantially free of desorbent hydrocarbon are recovered as a bottom liquid product from the third column 29 via line 30.

An overhead vapor stream comprising substantially desorbent hydrocarbon is recovered from the top of the third column 29 via line 31. This overhead vapor stream passes via line 31 into a condenser 32 wherein the overhead vapor stream is condensed at about its bubble point temperature. From the condenser 32 the condensate passes via line 33 into the recycle surge drum 15. A portion of the hydrocarbon contained in the recycle surge drum 15 is transferred via line 34 to the top of the third column 29 as overhead reflux.

From the recycle surge drum 15, a desorbent recycle stream is withdrawn via line 35. This desorbent recycle is transferred via line 35 to the recycle heater 36 wherein it is vaporized and superheated. The superheated desorbent vapor from the recycle heater 36 passes to the molecular sieve selective adsorption process 1 via line 37.

In the FIGS. 1 and 2 of the drawings and the above description of said drawings, many valves, pumps, reboilers, lines, instruments and other appurtenances unnecessary to describe the present invention have been omitted. The addition of such appurtenances will be obvious to one skilled in the art, and all such additions are included within the spirit and scope of the present invention.

As will be apparent to those skilled in the art upon reading the foregoing disclosure, many modifications, substitutions and changes are possible in the practice of this invention without departing from the spirit and scope thereof.

We claim:

1. In a molecular sieve selective adsorption process comprising an adsorption cycle and a desorption cycle operated in the vapor phase at an elevated temperature and a super atmospheric pressure employing a bed of selective adsorbent for recovering straight chain hydrocarbons from a hydrocarbon feed mixture, wherein a desorbent hydrocarbon vapor is employed in the desorption cycle, and wherein the desorbent hydrocarbon is recycled from the selective adsorbent bed effluent to the desorption cycle, which process is characterized by undesired coke lay-down in the selective adsorbent bed because of cracking of feed components and which is further characterized by progressive increase in cracking of feed components as the bed temperature is increased, the improvement which comprises:

separating an off-gas fraction containing from about 18 percent to about 25 percent desorbent hydrocarbons from the selective adsorbent effluent in a fractional distillation zone; and operating the fractional distillation zone to recover a liquid desorbent hydrocarbon recycle fraction substantially at the desorbent hydrocarbon bubble point temperature.

2. The method of claim 1 wherein the hydrocarbon feed mixture comprises straight chain and non-straight chain hydrocarbons in the $C_8 - C_{24}$ carbon number range and the desorbent hydrocarbon comprises straight chain hydrocarbons of from 1 to 3 carbon numbers less than the lightest straight chain component of the hydrocarbon feed mixture.

3. The method of claim 1 wherein the off-gas fraction is separated from the selective adsorbent effluent in the fractional distillation zone by:

separating a vapor fraction comprising desorbent and lighter hydrocarbons from the selective adsorbent effluent;

partially condensing the vapor fraction into an off-gas containing from about 18 percent to about 25 percent desorbent hydrocarbon and a condensate fraction; and returning the condensate fraction to the fractional distillation zone as reflux.

4. The method of claim 1 wherein the selective adsorbent effluent comprises an adsorption cycle effluent stream and a desorption cycle effluent stream, and wherein the fractional distillation zone comprises an adsorption cycle effluent fractional distillation system and a desorption cycle effluent fractional distillation system.

5. In a molecular sieve selective adsorption process comprising an adsorption cycle and a desorption cycle operated in the vapor phase at an elevated temperature and super-atmospheric pressure employing a bed of selective adsorbent for recovering straight chain hydrocarbon from a hydrocarbon feed stock, wherein said process is operated at a temperature of from about 0°F. to about 50°F. above the dew point temperature of said feed stock, wherein a vaporized desorbent hydrocarbon is employed in the desorption cycle, and wherein the desorbent hydrocarbon is recycled from the selected adsorbent bed effluent to the desorption cycle, which process is characterized by undesired coke lay-down in the selective adsorbent bed because of cracking of feed components and which is further characterized by progressive increase in cracking of feed components as the bed temperature is increased, the improvement for decreasing the rate of coke lay-down which comprises:

separating an off-gas fraction containing from about 18 percent to about 25 percent desorbent hydrocarbon from the selective adsorbent effluent in a fractional distillation zone; and operating the fractional distillation zone to recover substantially all the remaining desorbent hydrocarbon as a liquid at the desorbent hydrocarbon bubble point temperature.

6. The method of claim 5 wherein the hydrocarbon feed mixture comprises straight chain and non-straight chain hydrocarbons in the $C_8 - C_{14}$ carbon number range and the desorbent hydrocarbon comprises $C_7$ straight chain hydrocarbon.

7. In a molecular sieve selective adsorption process comprising an adsorption cycle and a desorption cycle operated in the vapor phase at an elevated temperature and super-atmospheric pressure and employing a bed of selective adsorbent for recovering straight chain hydrocarbons from a hydrocarbon feed mixture, wherein said process is operated at a temperature of from about 0°F. to about 50°F. above the dew point temperature of said feed stock, wherein a vaporized desorbent hydrocarbon is employed in the desorption cycle, and wherein the desorbent hydrocarbon is recycled from the selective adsorbent bed effluent to the desorption cycle, which process is characterized by undesired coke lay-down in the selective adsorbent bed because of cracking of feed components and which is further characterized by progressive increase in cracking of feed stock components as the bed temperature is increased, the improvement for increasing the operating temperature of the process without increasing the rate of coke lay-down which comprises:

separating an off-gas fraction containing from about 18 percent to about 25 percent desorbent hydrocarbon from the selective adsorbent effluent in a fractional distillation zone; and operating the fractional distillation zone to recover substantially all the remaining desorbent hydrocarbon as a liquid at the desorbent hydrocarbon bubble point temperature.

8. The method of claim 7 wherein the hydrocarbon feed mixture comprises straight chain and non-straight chain hydrocarbons in the $C_{13} - C_{24}$ carbon number range and the desorbent hydrocarbon comprises $C_{10}$ straight chain hydrocarbon.

* * * * *